Feb. 2, 1926.

H. B. TRIX

DEFLECTOR SUPPORT

Filed April 11, 1924

Inventor

Herbert B. Trix.

By Edward N. Pagelsen.
Attorney

Patented Feb. 2, 1926.

1,571,563

UNITED STATES PATENT OFFICE.

HERBERT B. TRIX, OF DETROIT, MICHIGAN.

DEFLECTOR SUPPORT.

Application filed April 11, 1924. Serial No. 705,800.

*To all whom it may concern:*

Be it known that I, HERBERT B. TRIX, a citizen of the United States, and residing at Detroit, in the county of Wayne and State of Michigan, have invented a new and Improved Deflector Support, of which the following is a specification.

This invention relates to means for supporting auxiliary deflectors or wind-wings on the windshield frames of automobiles or other supports, and its object is to provide a device of this character which shall be simple in construction, which will rigidly hold the deflectors or wings in position, and which can be quickly and easily adjusted and locked.

This invention consists of four brackets, two adapted to be secured to a support and the other two to the article to be supported, a rod to pivot the brackets together in pairs and to limit the space between the pairs, a spacing member such as a tube to hold the two pairs of brackets separated, and means such as a nut on one end of the spacing member to cause the spacing member to force the brackets of each pair against each other so as to prevent movement between them.

It also consists in the details of construction illustrated in the accompanying drawing and particularly pointed out in the claims.

Figure 1:
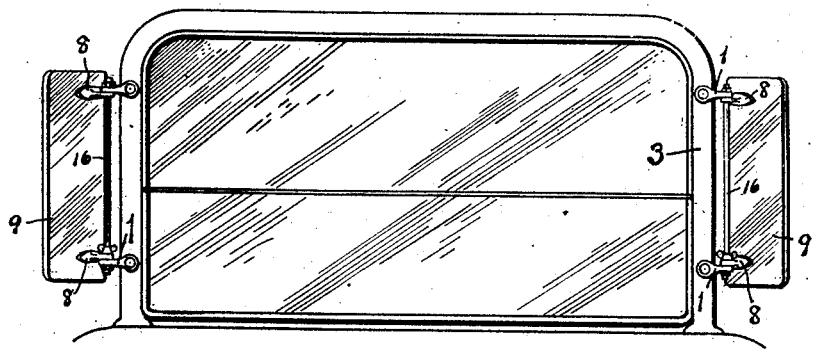
Figures 2, 3, 4:
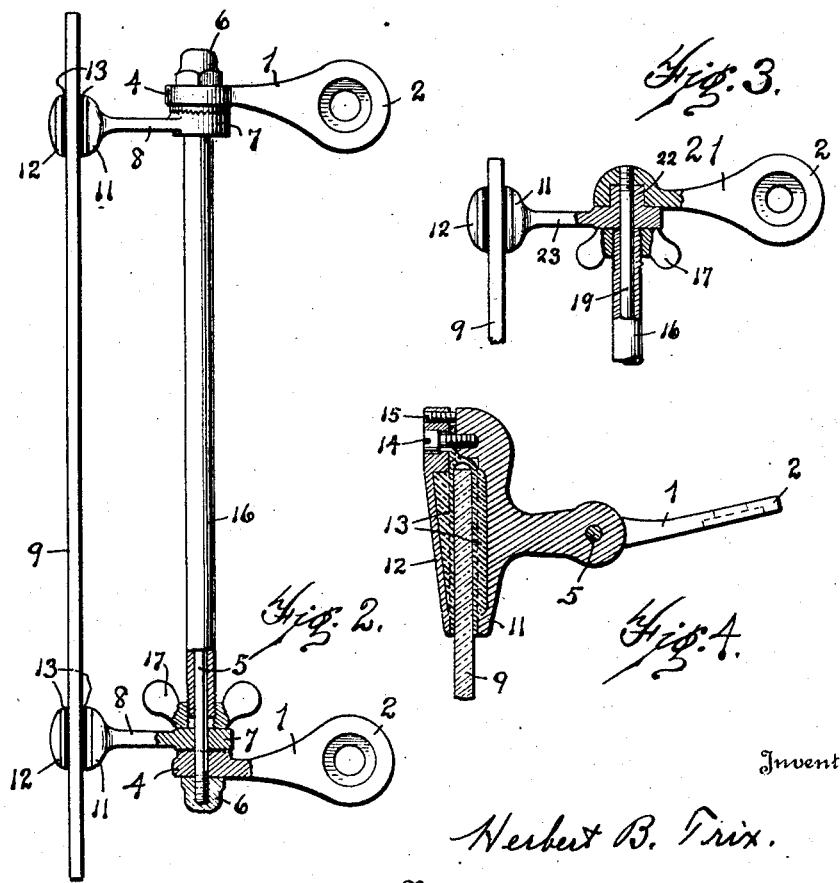

In the drawing, Fig. 1 is an elevation of a windshield equipped with wind-wings held in position by my novel support. Fig. 2 is a larger elevation of one of these novel supports. Fig. 3 is a vertical section of a pair of brackets embodying the present invention. Fig. 4 is a horizontal section of a clamping bracket.

Similar reference characters refer to like parts throughout the several views.

The supporting brackets 1 are preferably formed with eyes 2 to receive bolts or pins by which they may be secured to a frame 3 or any other available support. The opposite ends of the brackets 1 are formed with eyes 4 to receive the rod 5 which may have its ends threaded to receive the nuts 6. One face of each of the eyes 4 may be radially corrugated to fit similar corrugations of the eye 7 of the adjacent clamping bracket 8. A supporting and a clamping bracket constitute a pair.

The brackets 8 are formed to receive or grip the plates or wings 9 in any desired manner and preferably consist of a main jaw 11 and an auxiliary jaw 12, each preferably grooved to receive the rubber or other packing 13. The two jaws are held together by screws 14 and the pressure of the jaws may be adjusted by the screws 15 in the same manner as the well known carpenters' hand clamps.

A tubular spacing member 16 extends between the pairs of clamping members and is threaded at one end to receive the nut 17 which engages the inner clamp of one pair so as to force the clamps of each pair together with sufficient force to prevent rotation between them which is not difficult because of the radial corrugations of the contacting faces of the brackets.

It is evident that it is immaterial whether the supporting or the clamping brackets are on the outside. Instead of using the nuts 6 on the ends of the rod 5, the outer bracket of each pair may be threaded to receive the threaded end of the rod 19 as shown in Fig. 3. I have also shown the supporting bracket 21 countersunk to receive the small hub 22 on the clamping bracket 23.

Any other type of joint may be employed to furnish a secure connection between the brackets of each pair under the pull of the rod 19 and the pressure of the spacing tube 16 and nut 17. Simply screwing the nut 17 back onto the tube 16 removes the pressure between the brackets of each pair and permits the wings to be swung to any desired angle to the windshield and screwing the nuts in the opposite direction quickly locks the wings in the adjusted position.

The details of construction and the proportions of the parts may all be changed by those skilled in the art without departing from the spirit of my invention as set forth in the following claims.

I claim:—

1. In combination, two spaced supporting brackets, a clamping bracket in engagement with each supporting bracket, a rod extending through said brackets to limit the outward movement of the two outer brackets, a compression member extending between the two inner brackets and having a threaded end, and a nut on said threaded end in engagement with an inner bracket and adapted to press the opposite end of the compression member against the other inner bracket to press the inner and outer brackets together.

2. In combination, two spaced supporting brackets, a supported bracket in engagement with each supporting bracket, a rod extending through said brackets to limit the outward movement of the two outer brackets and to pivot the supported brackets, a tube mounted on the rod between the two inner brackets and having a threaded end, and a nut on said threaded end engaging an inner bracket and adapted to press the opposite end of the tube against the other inner bracket to force the contacting brackets together.

3. In combination, two spaced supporting brackets, a supported bracket in engagement with each supporting bracket, a rod extending through said brackets to limit the outward movement of the two outer brackets and to pivot the supported brackets, a tube mounted on the rod between the two inner brackets and having a threaded end, and a nut on said threaded end engaging an inner bracket and adapted to press the opposite end of the tube against the other inner bracket to force the contacting brackets together, the engaging faces of the brackets being radially corrugated to cause them to rigidly engage when pressed together.

4. In combination, two spaced supporting brackets, a clamping bracket in engagement with each supporting bracket, a rod connecting said brackets to limit the outward movement of the two outer brackets, a compression member extending between the two inner brackets and having a threaded end, and a nut on said threaded end in engagement with an inner bracket and adapted to press the opposite end of the compression member against the other inner bracket to press the inner and outer brackets together.

5. In combination, two spaced supporting brackets, a supported bracket in engagement with each supporting bracket a rod connecting said brackets to limit the outward movement of the two outer brackets and to pivot the supported brackets, a tube mounted on the rod between the two inner brackets and having a threaded end, and a nut on said threaded end engaging an inner bracket and adapted to press the opposite end of the tube against the other inner bracket to force the contacting brackets together.

HERBERT B. TRIX.